United States Patent [19]

Junkers

[11] Patent Number: 5,713,558
[45] Date of Patent: Feb. 3, 1998

[54] HYDRAULIC TENSIONER

[76] Inventor: John K. Junkers, 7 Arrowhead La., Saddle River, N.J. 07540

[21] Appl. No.: 406,367

[22] Filed: Mar. 17, 1995

[51] Int. Cl.$^6$ ........................................... E21B 19/00
[52] U.S. Cl. ............................................... 254/29 A
[58] Field of Search ........................ 254/29 A, 93 R, 254/93 M; 81/57.38; 91/533; 29/452

[56] References Cited

U.S. PATENT DOCUMENTS

| | | | |
|---|---|---|---|
| 3,008,362 | 11/1961 | Tucker | 81/57.38 |
| 3,718,205 | 2/1973 | Fair et al. | 91/533 |
| 4,074,890 | 2/1978 | Boudet et al. | 254/29 A |
| 4,314,690 | 2/1982 | Mlynarik et al. | 254/29 A |
| 4,949,943 | 8/1990 | Bernstein | 269/32 |
| 4,973,033 | 11/1990 | Sun | 269/32 |

*Primary Examiner*—Robert C. Watson
*Attorney, Agent, or Firm*—Michael J. Striker

[57] ABSTRACT

A hydraulic tensioner for tensioning a threaded connector has a substantially tubular housing having an axis, one axial end to abut against an object, and another opposite axial end, a substantially tubular engaging element arranged radially inside the housing so as to form a space therebetween and provided with engaging means for engaging a threaded connector, a plurality of pistons arranged in the space and spaced axially from one another so as to form a plurality of chambers in the space, and passages for supplying a working liquid into the chambers so as to apply a force to the housing and to the engaging element whereby when the housing abuts against the object in one axial direction, the engaging element is displaced axially in an opposite direction and thereby axially pulls the threaded connector in an opposite axial direction. The radially outer dimension of the chambers reduces in a direction from the another axial end to the one axial end of the housing.

12 Claims, 3 Drawing Sheets

HYDRAULIC TENSIONER

BACKGROUND OF THE INVENTION

The present invention relates to a hydraulic tensioner.

Stud tensioning requires the use of a tool with a small diameter and possibly a low height, so as to fit into multiple applications. In the past, a user had to determine if a customer required a low height tensioner or a small-diameter tensioner, since it was impossible to make a tensioner that would meet both parameters. While small-diameter tensioners utilize a multi-stage system in which several cylinder chambers are stagged on top of each other so as to obtain the required pulling load, low height tensioners usually consisted of one single-cylinder chamber. A multistage system includes a plurality of individual cylinder chambers mounted on top of each other so that the bottom piston is connected with the piston in the cylinder chamber above to push that piston, while it is also being pushed by the hydraulic pressure. In other words each piston located above another piston would generate the combined force of both. Such a tensioner is disclosed for example in the U.S. patent application Ser. No. 07/996,962 filed on Dec. 23, 1992 now U.S. Pat. No. 5,398,574. As most applications, however, have smaller radial clearances around the bolt than above it, it was in many instance impossible to make a tensioner small enough in its lower diameter to fit. In addition the manufacture and assembly of the known tensioners is time consuming and expensive.

SUMMARY OF THE INVENTION

Accordingly, it is an object of the present invention to provide a hydraulic tensioner, which avoids the disadvantages of the prior art.

In keeping with these objects and with others which will become apparent hereinafter, one feature of the present invention resides, briefly stated, in a hydraulic tensioner for tensioning a threaded connector which has a substantially tubular housing having an axis, one axial end to abut against an object and another opposite axial end, an axially extending engaging element arranged radially inside the housing so as to form as space therebetween and provided with engaging means for engaging a threaded connector, a plurality of chambers formed in the space, a plurality of piston means axially moveable in the chambers, and means for supplying a working liquid into the chambers so as to apply a force to the housing and to the engaging element whereby when the housing abuts against the object in one axial direction, the engaging element is displaced axially in an opposite axial direction and thereby axially pulls the threaded connector in the opposite axial direction, and the radially outer dimension of the chambers reducing in a direction from the another axial end to the one axial end of the housing.

When the hydraulic tensioner is designed in accordance with the present invention, the lower end of the tensioner cooperating with the threaded connector has a small diameter and can fit in small radial clearance around the threaded connector. The (its) manufacturing and assembly costs of the tensioner are reduced. Only one engaging element and only one housing can be used in the inventive multi-stage tensioner. The housing can change its inner diameter with every cylinder chamber, while the engaging element can change its outer diameter with every cylinder chamber, so that at the location of each piston the outside diameter of the engaging element and the inside diameter of the housing are increased relative to the cylinder chamber below. By taking the advantage of the fact that each piston only applies a given force and that the tensioning force applied to the engaging element by the bottom piston is less than the combined force of two or three pistons, less material to transfer this force onto the engaging element is required, so that the outer diameter of the tensioner in the region which is close to the stud to be tensioned can be smaller.

The novel features which are considered as characteristic for the invention are set forth in particular in the appended claims. The invention itself, however, both as to its construction and its method of operation, together with additional objects and advantages thereof, will be best embodiments when read in connection with the accompanying drawings.

DESCRIPTION OF THE..PREFERRED EMBODIMENTS

Figure 1:
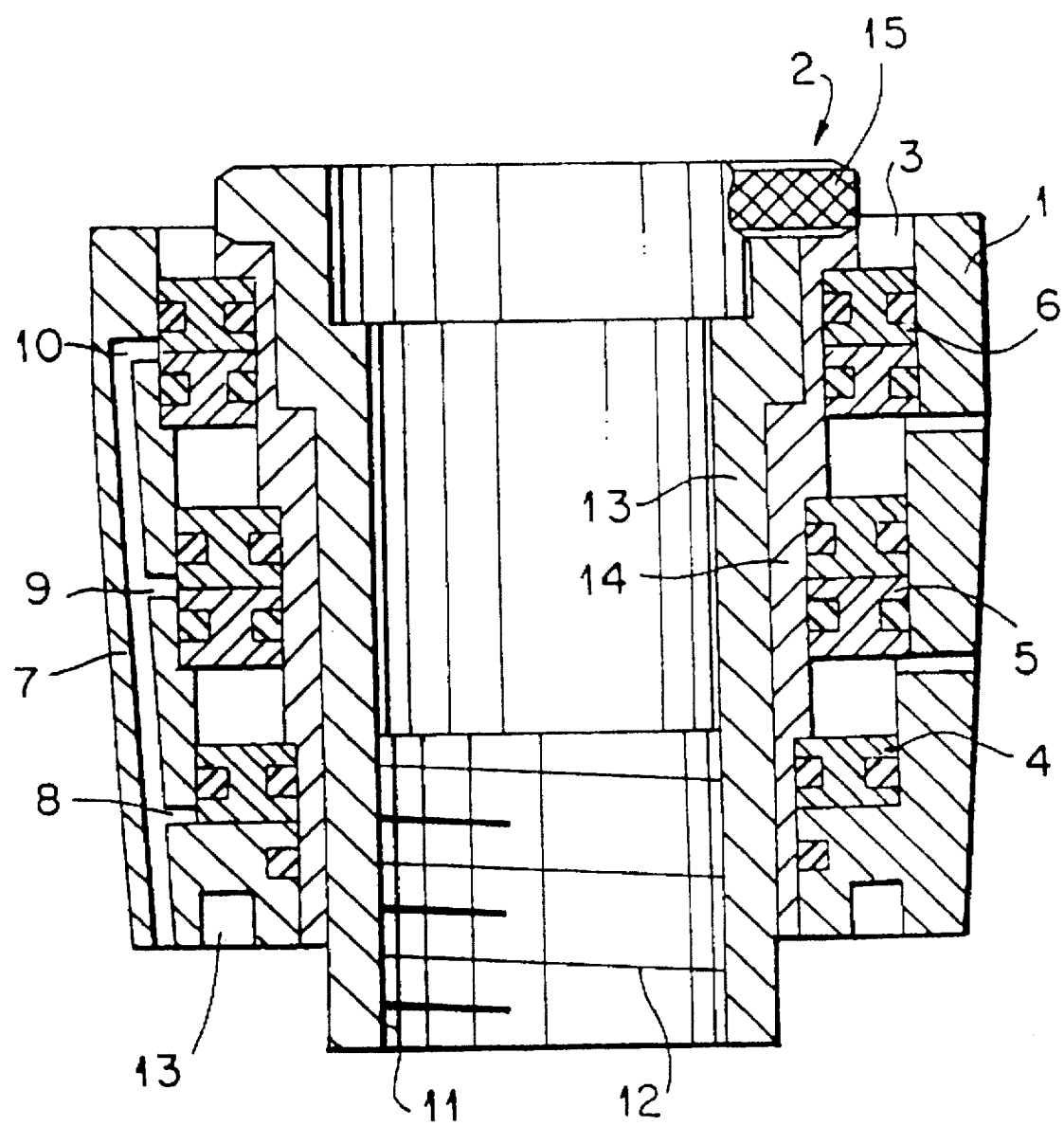
FIG. 1 of the drawings is a view showing a cross-section section of a hydraulic tensioner in accordance with the present invention.

A tensioner in accordance with the present invention has a housing which is identified as a whole with reference numeral 1 and is formed as a substantially cylindrical element. The tensioner further has an engaging element which is identified as a whole with reference numeral 2 and formed also as a substantially tubular element located radially inwardly of the housing 1 so as to form a space 3 therebetween. The radially outer surface of the engaging element 2 is provided with a plurality of steps, while the radially inner surface of the housing 1 is also provided with a plurality of steps.

The hydraulic tensioner further has a plurality of piston means identified with reference numerals 4, 5, 6. The piston means 4 is formed as a single piston or floating body abutting against an axially upper surface of the lower end of the housing 1 and against the lower shoulder of the engaging element 2. The piston means 5 and 6 each include two pistons located adjacent to one another and abutting against a shoulder of the housing and a shoulder of the engaging element correspondingly in the position shown in the drawing. As can be seen from the drawing, the stepped shapes of the radially inner surface of the housing 1 and of the radially outer surface of the engaging element 2 are such that the radial dimensions of steps diminish from the upper end toward the lower end of the tensioner.

The tensioner further has means for supplying a hydraulic liquid. The hydraulic liquid supplying means includes a substantially axial passage 7 and substantially radial passages 8, 9 and 10. The passage 8 leads in an area underneath the lower piston means 4, while the passages 9 and 10 each lead in an area between the individual pistons of the piston means 5 and 6 correspondingly. The engaging element 2 is provided with engaging means 11 which can be formed in particular as a thread provided in an inner opening 12 of the engaging element. Since at least the radially outer diameter of the diameter or in other words the radially outer surface of the engaging element 2 and the radially inner surface of the housing 1 have radial dimensions diminishing in direction from the upper end to the lower end of the tensioner, the outer surface of the housing 1 can also have a diameter diminishing in the same direction as shown in the drawings. An annular recess 13 is provided for a weight reduction of the tensioner.

The hydraulic tensioner in accordance with the present invention operates in the following manner:

The tensioner is first arranged on a threaded connector so that the thread 11 of the engaging element 2 is screwed on the threaded connector, for example, on the threaded stud. Then the liquid is supplied through the passages 7, 8, 9, 10. The liquid flows through the passage 8 enters underneath the piston 4 and presses the housing 1 downwardly and the piston 4 upwardly. The hydraulic liquid flowing through the passages 9 and 10 presses the lower piston of each piston means 5 and 6 downwardly and the upper piston of each piston means 5 and 6 upwardly. Since the housing 1 is placed on an object, for example on a flange in which the threaded stud is screwed, the housing cannot move downwardly, and therefore the engaging element 2 is displaced upwardly so as to pull and therefore to tension the stud in the flange.

As can be seen from the drawing, the engaging element 2 can include a radially inner puller member 13 which is provided with the opening 12 having the thread 11, and the radially outer transmission member 14 which surrounds the puller member and has the radially outer stepped surface described hereinabove. The transmission member 14 is not connected with the puller member 13, but instead during the operation axially abuts against the puller member 13 due to the cooperation between the shoulders of the puller member 13 and the transmission member 14. In such a construction the puller member 13 can be easily removed from the transmission member 14 and replaced with another puller member having for example different engaging means, i.e., the different opening 12 with a different thread 11 to correspond to a specific threaded connector. The upper end of the puller member 13 can be provided, for example, with knurling to be engaged by a user for removal of the old puller member and insertion of the puller member. It is of course understood that the engaging element 2, instead of being composed of two members 13 and 14, can be formed as a one-piece element. As shown in the drawings, the radial widths of the pistons and the chambers in which the pistons axially displace are identical for all pistons and all chambers. However, such an arrangement is not necessary, and it is possible to provide the pistons and the chambers which have different radial dimensions.

Figure 2:
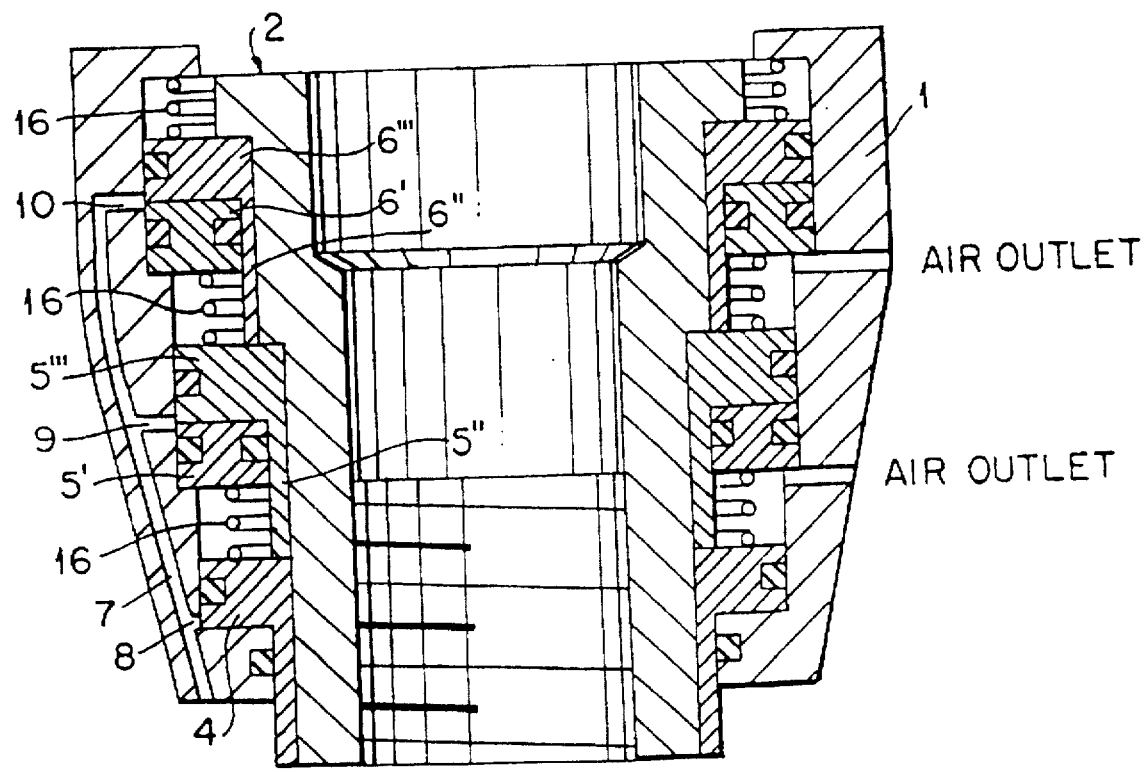
FIG. 2 is a view showing the inventive hydraulic tensioner in accordance with another embodiment of the present invention.

The hydraulic tensioner in accordance with the second embodiment shown in FIG. 2 is substantially similar to the hydraulic tensioner of FIG. 1. However, here the piston means 5' and 6' are formed somewhat differently. Each piston means 5' and 6' have a first piston 5", 6" and a second piston 5"' and 6"', which are formed and arranged so that the piston 5"', 6"' surrounds the piston 5", 6" radially inwardly and extend axially downwardly to abut against a neighboring, downwardly located piston. Also, the piston means are connected with one another by return spring 16.

Figure 3:
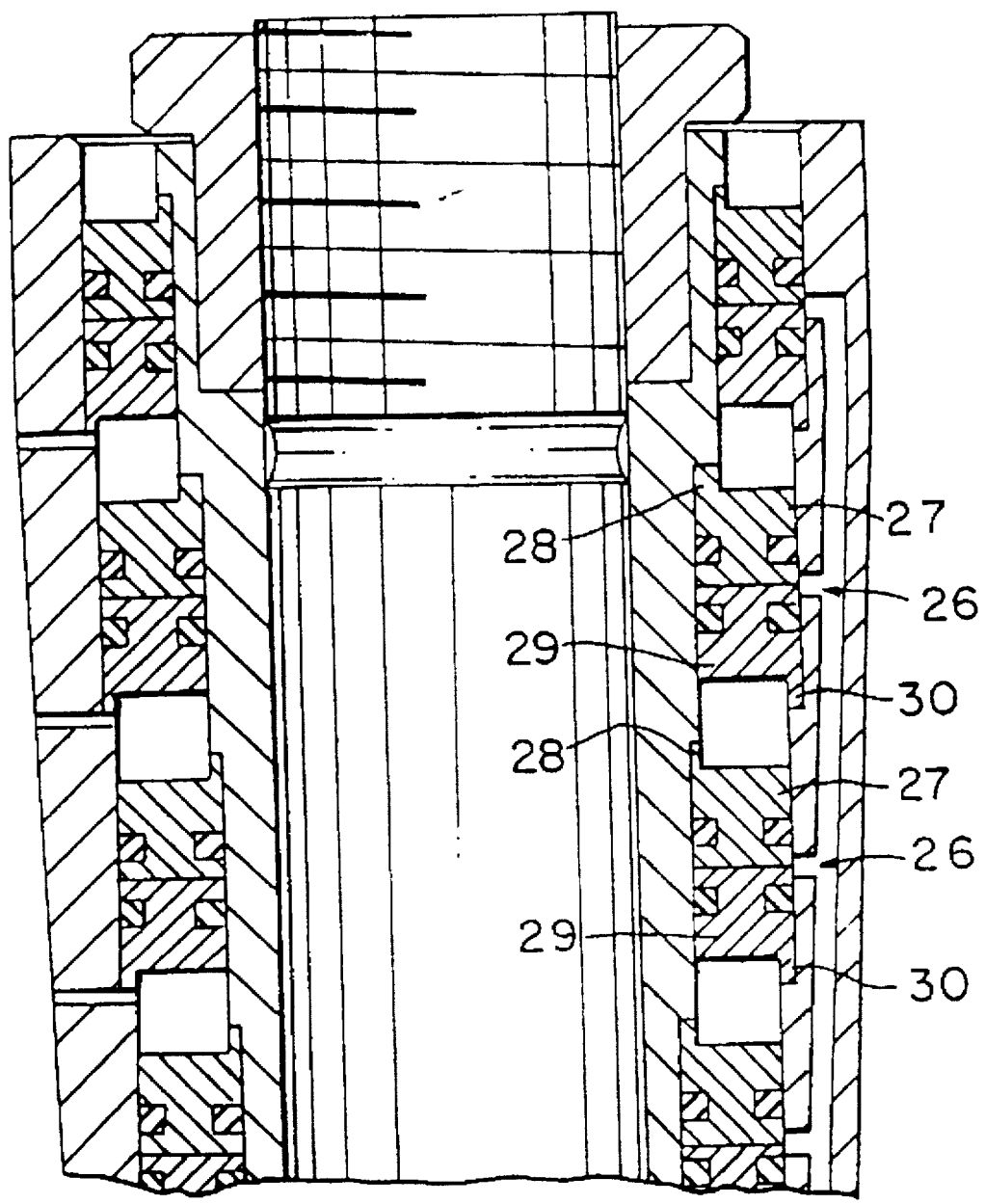
FIG. 3 is a view showing still a further embodiment of the inventive hydraulic tensioner.

The hydraulic tensioner of FIG. 3 is substantially similar to the hydraulic tensioners of FIGS. 1 and 2. The piston means in this tensioner are, however, different. Each piston means 26, with the exception of the lowermost piston means, has an upper piston 27 provided with a radially inner ring-shaped projection 28 which extends axially upwardly, and a lower piston 29 provided with a radially outer ring-shaped projection 30 which extends axially downwardly. The radially inner projections 28 of the pistons 27 abut axially against the steps of the engaging element 2, while the radially outer projections 30 of the pistons 29 abut against the steps of the housing 1. In such a construction the seals in the pistons are reliably protected, and at the same time the overall axial height of the tensioner is reduced.

It will be understood that each of the elements described above, or two or more together, may also find a useful application in other types of constructions differing from the types described above.

While the invention has been illustrated and described as embodied in a hydraulic tensioner, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A hydraulic tensioner for tensioning a threaded connector, comprising a substantially tubular housing having an axis, one axial end to abut against an object, and another opposite axial end; a substantially tubular engaging element arranged radially inside said housing so as to form a space therebetween and provided with engaging means for engaging a threaded connector; a plurality of piston means arranged in said space and spaced axially from one another so as to form in said space a plurality of chambers having radially inner and outer dimensions; and means for supplying a working liquid into said chambers so as to apply a force to said housing and to said engaging element whereby when said housing abuts against the object in one axial direction, said engaging element is displaced axially in an opposite direction and thereby axially pulls the threaded connector in an opposite axial direction, said radially outer dimension of said chambers reducing in a direction from said another axial end to said one axial end of said housing.

2. A hydraulic tensioner as defined in claim 1, wherein said housing has a radially inner surface provided with a plurality of steps against which said piston means abut.

3. A hydraulic tensioner as defined in claim 1, wherein said engaging element has a radially outer surface provided with a plurality of steps against which said piston means abuts.

4. A hydraulic tensioner as defined in claim 3, wherein said engaging element includes a radially inner pulling member and a radially outer transmission member axially abutting against said pulling member, said radially inner pulling member having an opening provided with said engaging means, said radially outer transmission member being provided with said radially outer surface.

5. A hydraulic tensioner as defined in claim 1, wherein said piston means includes a piston located closer to said one end of said housing and forming a floating base, the remaining ones of said piston means each including two pistons located axially adjacent to one another, said means for supplying a hydraulic liquid being formed so as to supply the hydraulic liquid in an area between said floating body and said one end of said housing and also in areas between two pistons of each of said remaining piston means.

6. A hydraulic tensioner as defined in claim 1, wherein at least some of said piston means includes a first piston and a second piston arranged so that said second piston radially inwardly surrounds said first piston of a respective one of said piston means, and said second piston of one of said piston means axially abuts against said second piston of another of said piston means.

7. A hydraulic tensioner as defined in claim 1, wherein said housing has an outer surface with a diameter reducing in direction from said another end toward said one end.

8. A hydraulic tensioner as defined in claim 1, wherein said housing is formed as a one-piece element which is uninterrupted in the axial direction.

9. A hydraulic tensioner as defined in claim 1, wherein said engaging element is formed as an element which is uninterrupted in the axial direction.

10. A hydraulic tensioner as defined in claim 1, wherein said housing and said engaging element are formed as elements which are uninterrupted in the axial direction.

11. A hydraulic tensioner as defined in claim 1, wherein at least some of said piston means includes a first piston provided with a radially inner ring-shaped projection and abutting against said engaging element and a second piston provided with a radially outer ring-shaped projection abutting against said housing.

12. A hydraulic tensioner as defined in claim 11, wherein said projections of each of said some piston means extend in opposite axial directions and axially abut against said engaging element and said housing correspondingly.

* * * * *